United States Patent
Helm et al.

(10) Patent No.: US 11,797,531 B2
(45) Date of Patent: *Oct. 24, 2023

(54) ACCELERATION OF DATA QUERIES IN MEMORY

(71) Applicant: Micron Technology, Inc., Boise, ID (US)

(72) Inventors: Mark A. Helm, Santa Cruz, CA (US); Joseph T. Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/984,471

(22) Filed: Aug. 4, 2020

(65) Prior Publication Data

US 2022/0043808 A1    Feb. 10, 2022

(51) Int. Cl.
*G06F 16/245* (2019.01)
*G06F 3/06* (2006.01)
(Continued)

(52) U.S. Cl.
CPC .......... *G06F 16/245* (2019.01); *G06F 3/0604* (2013.01); *G06F 3/0647* (2013.01); *G06F 3/0673* (2013.01); *G06F 21/602* (2013.01); *G11C 16/0483* (2013.01); *G11C 16/24* (2013.01); *G11C 16/26* (2013.01); *H10B 41/27* (2023.02)

(58) Field of Classification Search
CPC .... G06F 16/245; G06F 3/0604; G06F 3/0647; G06F 3/0673; G06F 21/602; G11C 16/0483; G11C 16/24; G11C 16/26; H01L 27/11556

See application file for complete search history.

(56) References Cited

U.S. PATENT DOCUMENTS 5,465,056 A * 11/1995 Hsieh ................ H03K 19/1736
326/38
6,009,262 A * 12/1999 Uematsu ................ G06F 8/45
712/18
(Continued)

OTHER PUBLICATIONS

Carter, "Securing SQL Server: DBAs Defending the Database", APress (Year: 2018).*
(Continued)

*Primary Examiner* — Irete F Ehichioya
*Assistant Examiner* — Huen Wong
(74) *Attorney, Agent, or Firm* — Brooks, Cameron & Huebsch, PLLC

(57) ABSTRACT

The present disclosure includes apparatuses, methods, and systems for acceleration of data queries in memory. An example host apparatus includes a controller configured to generate a search key, generate a query for particular data stored in an array of memory cells in a memory device, and send the query to the memory device. The query includes a command to search for the particular data. The query also includes a number of data fields for the particular data including a logical block address (LBA) for the particular data, an LBA offset for the particular data, and a parameter for an amount of bits in data stored in the memory device that do not match corresponding bits in the search key that would result in data not being sent to the host.

26 Claims, 8 Drawing Sheets

(51) Int. Cl.
*G06F 21/60* (2013.01)
*G11C 16/24* (2006.01)
*G11C 16/04* (2006.01)
*G11C 16/26* (2006.01)
*H10B 41/27* (2023.01)

(56) References Cited

U.S. PATENT DOCUMENTS

| | | | | |
|---|---|---|---|---|
| 6,909,926 | B2* | 6/2005 | Yoshioka | G05B 19/41875 |
| | | | | 700/109 |
| 7,058,642 | B2 | 6/2006 | Kurupati et al. | |
| 7,304,873 | B1* | 12/2007 | Gupta | G11C 15/00 |
| | | | | 365/49.1 |
| 7,369,343 | B1* | 5/2008 | Yeo | G11B 19/041 |
| 7,761,774 | B2* | 7/2010 | Fischer | G11C 15/04 |
| | | | | 714/768 |
| 7,979,667 | B2* | 7/2011 | Allen | G06F 16/90339 |
| | | | | 711/E12.059 |
| 8,817,541 | B2* | 8/2014 | Li | G11C 15/046 |
| | | | | 365/185.17 |
| 9,098,403 | B2* | 8/2015 | Sprouse | G11C 11/5642 |
| 10,127,150 | B2* | 11/2018 | Sprouse | G11C 11/5642 |
| 10,146,616 | B1* | 12/2018 | Shilane | G06F 12/0895 |
| 10,318,378 | B2 | 6/2019 | Hoei et al. | |
| 11,170,869 | B1* | 11/2021 | Helmick | H03M 13/1145 |
| 11,392,494 | B2* | 7/2022 | Khan | G06F 12/0692 |
| 2004/0205297 | A1* | 10/2004 | Bearden | G06F 12/0804 |
| | | | | 711/E12.04 |
| 2006/0101060 | A1* | 5/2006 | Li | G06F 16/90335 |
| | | | | 707/E17.02 |
| 2006/0107184 | A1* | 5/2006 | Kim | G11C 29/44 |
| | | | | 714/760 |
| 2006/0218412 | A1* | 9/2006 | Hars | G11B 20/0013 |
| | | | | 713/193 |
| 2006/0218647 | A1* | 9/2006 | Hars | H04L 63/08 |
| | | | | 726/27 |
| 2007/0015589 | A1* | 1/2007 | Shimizu | G06F 21/6245 |
| | | | | 463/43 |
| 2007/0143108 | A1* | 6/2007 | Kurozumi | G10H 1/00 |
| | | | | 704/239 |
| 2007/0143592 | A1* | 6/2007 | Kitani | G06F 21/10 |
| | | | | 713/150 |
| 2008/0056005 | A1* | 3/2008 | Aritome | G06F 11/1068 |
| | | | | 714/E11.038 |
| 2009/0150646 | A1* | 6/2009 | Allen | G06F 12/0246 |
| | | | | 711/213 |
| 2009/0217140 | A1* | 8/2009 | Jo | G06F 11/1068 |
| | | | | 714/E11.032 |
| 2009/0323384 | A1* | 12/2009 | Lam | G11C 15/046 |
| | | | | 365/49.17 |
| 2014/0310536 | A1* | 10/2014 | Shacham | G06F 21/78 |
| | | | | 713/193 |
| 2015/0016172 | A1* | 1/2015 | Loh | G06F 3/0608 |
| | | | | 365/51 |
| 2016/0011930 | A1* | 1/2016 | Yeh | G06F 11/076 |
| | | | | 714/15 |
| 2016/0034358 | A1* | 2/2016 | Hayasaka | G06F 12/0802 |
| | | | | 711/113 |
| 2016/0283728 | A1* | 9/2016 | Antonopoulos | G06F 21/6209 |
| 2017/0083554 | A1* | 3/2017 | Harari | G06F 16/2379 |
| 2017/0185480 | A1* | 6/2017 | Choi | G06F 3/061 |
| 2017/0285949 | A1* | 10/2017 | Trika | G06F 12/10 |
| 2018/0196768 | A1 | 7/2018 | Okita | |
| 2019/0065392 | A1 | 2/2019 | Erez et al. | |
| 2019/0171839 | A1 | 6/2019 | Rozenberg et al. | |
| 2019/0220230 | A1* | 7/2019 | Khan | G06F 12/0207 |
| 2019/0294358 | A1* | 9/2019 | Suzuki | G06F 3/064 |
| 2020/0142619 | A1* | 5/2020 | Ke | G06F 11/07 |
| 2020/0264874 | A1* | 8/2020 | Tepper | G06F 16/137 |
| 2020/0265098 | A1* | 8/2020 | Tepper | G06F 7/02 |
| 2020/0301825 | A1* | 9/2020 | Chauhan | G06F 12/0207 |
| 2021/0081462 | A1* | 3/2021 | Lu | G06F 16/953 |
| 2021/0294780 | A1* | 9/2021 | Lifsches | G06F 16/2237 |

OTHER PUBLICATIONS

NIST, Definition of Hamming Distance, NIST (Year: 2006).*
International Search Report and Written Opinion from related International Patent Application No. PCT/US2021/043371, dated Nov. 8, 2021, 10 pages.

* cited by examiner

| Command | Address | Data Input | Data Output |
|---|---|---|---|
| Search 374 | Starting 376 | Search Key 380 | Status 382 |
|  | Ending 378 |  | 384 — Data from Match Result |

*Fig. 3*

ACCELERATION OF DATA QUERIES IN MEMORY

TECHNICAL FIELD

The present disclosure relates generally to semiconductor devices and methods, and more particularly to apparatuses, methods, and systems for acceleration of data queries in memory.

BACKGROUND

Memory devices are typically provided as internal, semiconductor, integrated circuits in computers or other electronic systems. There are many different types of memory including volatile and non-volatile memory. Volatile memory may require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory may provide persistent data by retaining stored data when not powered and may include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems may include a host and a memory device that each include a controller. The host controller may send instructions to the memory device, such as instructions to execute a command to retrieve data from the memory device and store the results of the executed command to a suitable location. The memory device controller may comprise a number of functional units such as arithmetic logic unit (ALU) circuitry, floating point unit (FPU) circuitry, and/or a combinatorial logic block, for example, which may be used to execute instructions by performing an operation on data (e.g., one or more operands). As used herein, an operation may be, for example, a Boolean operation, such as AND, OR, NOT, NAND, NOR, and XOR, and/or other operations (e.g., invert, shift, arithmetic, statistics, among many other possible operations). In many instances, the processing resources may be external to the memory array of the memory device, and data may be accessed via a bus between the processing resources and the memory array to execute a set of instructions.

BRIEF DESCRIPTION OF THE DRAWINGS

FIG. 3 is an example representation of a communication protocol for the acceleration of data queries in accordance with a number of embodiments of the present disclosure.

DETAILED DESCRIPTION

Figure 1:
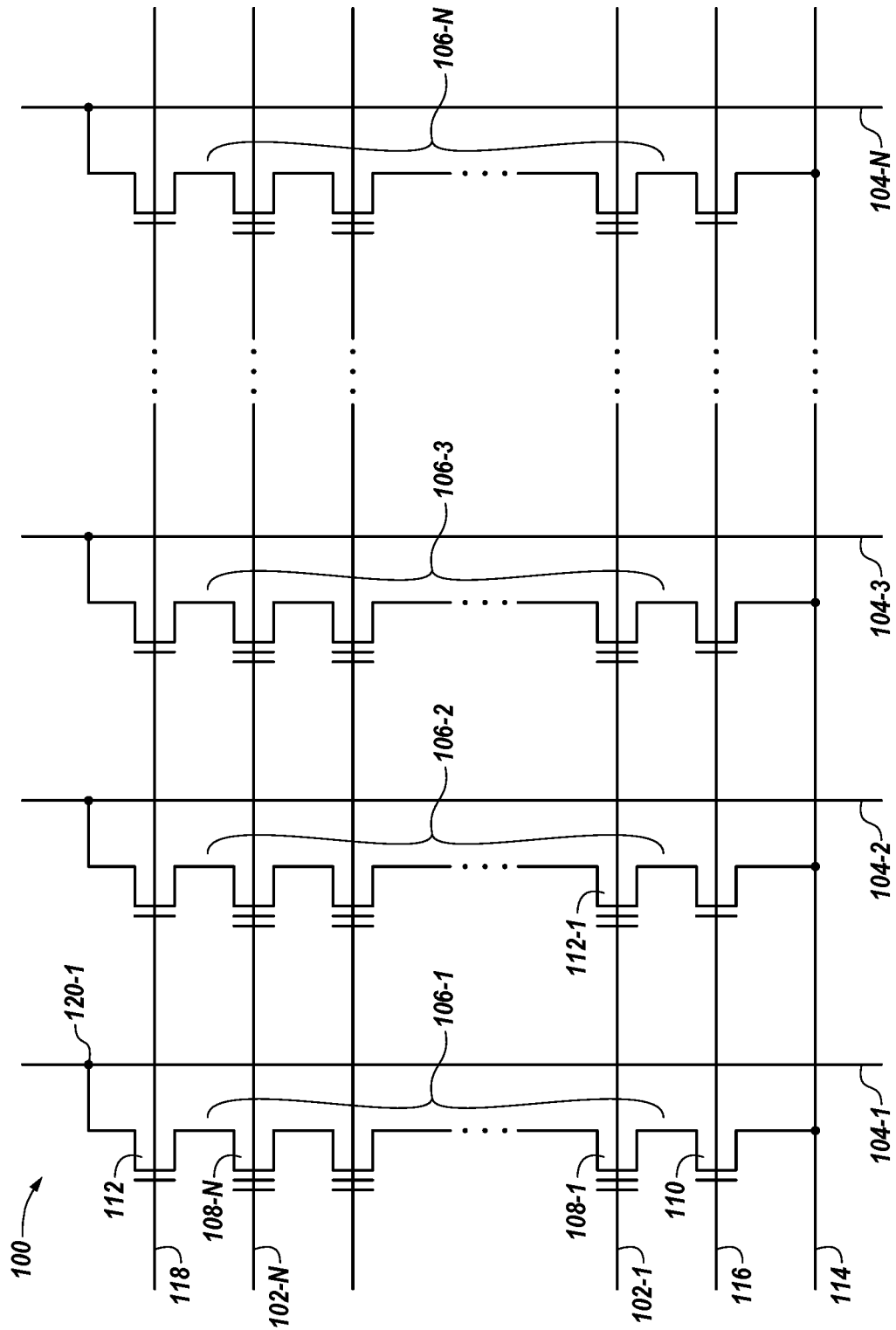
FIG. 1 is a schematic diagram of a portion of a memory array in accordance with a number of embodiments of the present disclosure.

The present disclosure includes apparatuses, methods, and systems for acceleration of data queries in memory, such as three-dimensional (3D) memory, as opposed to a separate integrated circuit dedicated to processing, like a CPU, GPU, ASIC, or FPGA. A number of embodiments include a host that includes a controller configured to generate a search key, generate a query for particular data stored an array of memory cells, and send the query to the memory device. The query includes a command to search for the particular data and a number of data fields for the particular data including a logical block address (LBA) for the particular data, an LBA offset for the particular data, and a parameter for an amount of bits in data stored in the memory device that do not match corresponding bits in the search key that would result in the data not being sent to the host.

Memory, such as, for instance, three-dimensional (3D) NAND flash memory, may be used as a database in a computing system. In some previous approaches, the coordination of queries (e.g., searches) for data stored in the memory (e.g., in the database) may be controlled by circuitry external to the memory. For example, in some previous approaches, when a user of a host computing device coupled to the memory issues a query for some particular data stored in the memory, data (e.g., pages of data) stored in the memory is transferred from the memory to the host, and the host then processes the received data to identify any data included therein that matches the query (e.g., that satisfies the parameters of the query). For instance, the host may perform operations, such as, for instance, arithmetic operations, on the data to identify the data from the memory that matches the query.

Controlling data queries via circuitry external to the memory in such a manner, however, may be inefficient due to the amount of time (e.g., delay) associated with transferring (e.g., sending) all the data from the memory to the external circuitry (e.g., host) for processing. This delay may be further exacerbated by bandwidth bottlenecks that may occur between the memory and the host.

In contrast, embodiments of the present disclosure may utilize a protocol in a host controller to instruct circuitry that is resident on (e.g., physically located on or tightly coupled to) the memory to process a data query issued by the host (e.g., to identify the data stored in the memory that matches the query). For instance, embodiments of the present disclosure may utilize the protocol to instruct circuitry resident on 3D NAND to perform operations to identify the data that perfectly matches and/or more closely matches the query, such that only the data in the memory that perfectly matches and/or more closely matches the query is sent to the host (e.g., rather than having to send all the data from the memory to the host for processing).

Accordingly, embodiments of the present disclosure may accelerate (e.g., increase the speed of) data queries as compared to previous approaches (e.g., approaches in which the queries are controlled via external circuitry). Additionally, embodiments of the present disclosure may perform the operations of the data query on multiple portions of the data stored in the memory in parallel, which may further accelerate the query.

In addition to accelerating the data queries, embodiments of the present disclosure may reduce energy consumption as compared to previous approaches. Since the memory device of the present disclosure sends less data to the host than in previous approaches, less energy may be used to send the data from the memory device to the host than in previous approaches. A benefit of reducing the amount of energy used to transfer the data is a reduction of the cost associated with transferring the data. There is a monetary cost associated with using energy to power the operation of components in a memory system. By reducing the amount of energy used to power any of these operations, the cost associated with powering these operations may also decrease.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a", "an", or "a number of" something may refer to one or more such things, and "a plurality of" something can refer to two or more such things. For example, a number of memory cells may refer to at least one memory cell, and a plurality of memory cells can refer to two or more memory cells.

The figures herein follow a numbering convention in which the first digit or digits correspond to the figure number of the drawing and the remaining digits identify an element or component in the drawing. Similar elements or components between different figures may be identified by the use of similar digits. For example, reference numeral 102 may reference element "02" in FIG. 1, and a similar element may be referenced as 202 in FIG. 2. Multiple analogous elements within one figure may be referenced with a reference numeral followed by a hyphen and another numeral or a letter. For example, 104-1 may reference element 04-1 in FIGS. 1 and 104-2 may reference element 04-2, which may be analogous to element 104-1. Such analogous elements may be generally referenced without the hyphen and extra numeral or letter. For example, elements 104-1 and 104-2 or other analogous elements may be generally referenced as 104.

FIG. 1 is a schematic diagram of a portion of a memory array 100 in accordance with a number of embodiments of the present disclosure. The embodiment of FIG. 1 illustrates a NAND architecture non-volatile memory array, such as, for instance, a portion of a 3D NAND array. However, embodiments described herein are not limited to this example. As shown in FIG. 1, memory array 100 includes access lines 102-1, . . . , 102-N (individually or collectively referred to as access lines 102) and sense lines 104-1, 104-2, 104-3, . . . , 104-N (individually or collectively referred to as sense lines 104). The access lines 102 may also be referred to as conductive lines or word lines. The sense lines 104 may also be referred to as conductive lines, data lines, or bit lines. For ease of addressing in the digital environment, the number of access lines 102 and the number of sense lines 104 may be some power of two (e.g., 266 access lines by 4,096 sense lines).

Memory array 100 may include NAND strings 106-1, 106-2, 106-3, . . . , 106-N (individually or collectively referred to as NAND strings 106). Each NAND string 106 may include non-volatile memory cells 108-1, . . . , 108-N (individually or collectively referred to as memory cells 108), each communicatively coupled to a respective access line 102. Each NAND string 106 (and its constituent memory cells 108) may also be associated with a sense line 104. The non-volatile memory cells 108 of each NAND string 106 may be connected in series between a source select gate (SGS) (e.g., a field-effect transistor (FET)) 110, and a drain select gate (SGD) (e.g., FET) 112. Each source select gate 110 may be configured to selectively couple a respective NAND string 106 to a common source 114 responsive to a signal on source select line 116, while each drain select gate 112 may be configured to selectively couple a respective NAND string 106 to a respective sense line 104 responsive to a signal on drain select line 118.

As shown in the embodiment illustrated in FIG. 1, a source of source select gate 110 may be connected to the common source 114. A drain of source select gate 110 may be connected to memory cell 108-1 of the corresponding NAND string 106-1. The drain of drain select gate 112 may be coupled to sense line 104-1 of the corresponding NAND string 106-1 at drain contact 120-1. The source of drain select gate 112 may be coupled to memory cell 108-N (e.g., a floating-gate transistor) of the corresponding NAND string 106-1.

In a number of embodiments, construction of non-volatile memory cells 108 may include a charge storage structure such as a floating gate, and a control gate. Non-volatile memory cells 108 may couple their control gates to access lines 102. A "column" of the non-volatile memory cells 108 may make up the NAND strings 106 and may be coupled to a given sense line 104. A "row" of the non-volatile memory cells may be those memory cells commonly coupled to a given access line 102. The use of the terms "column" and "row" is not meant to imply a particular linear (e.g., vertical and/or horizontal) orientation of the non-volatile memory cells 108. A NOR array architecture would be similarly laid out, except that the string of memory cells would be coupled in parallel between the select gates.

Subsets of cells coupled to a selected access line (e.g., 102-1, . . . , 102-N) can be programmed and/or sensed (e.g., read) together (e.g., at the same time). A program operation (e.g., a write operation) can include applying a number of program pulses (e.g., 16V-20V) to a selected access line in order to increase the threshold voltage (Vt) of selected cells coupled to that selected access line to a desired program voltage level corresponding to a target (e.g., desired) data state. A sense operation, such as a read or program verify operation, can include sensing a voltage and/or current change of a sense line coupled to a selected cell in order to determine the data state of the selected cell.

Figure 2:
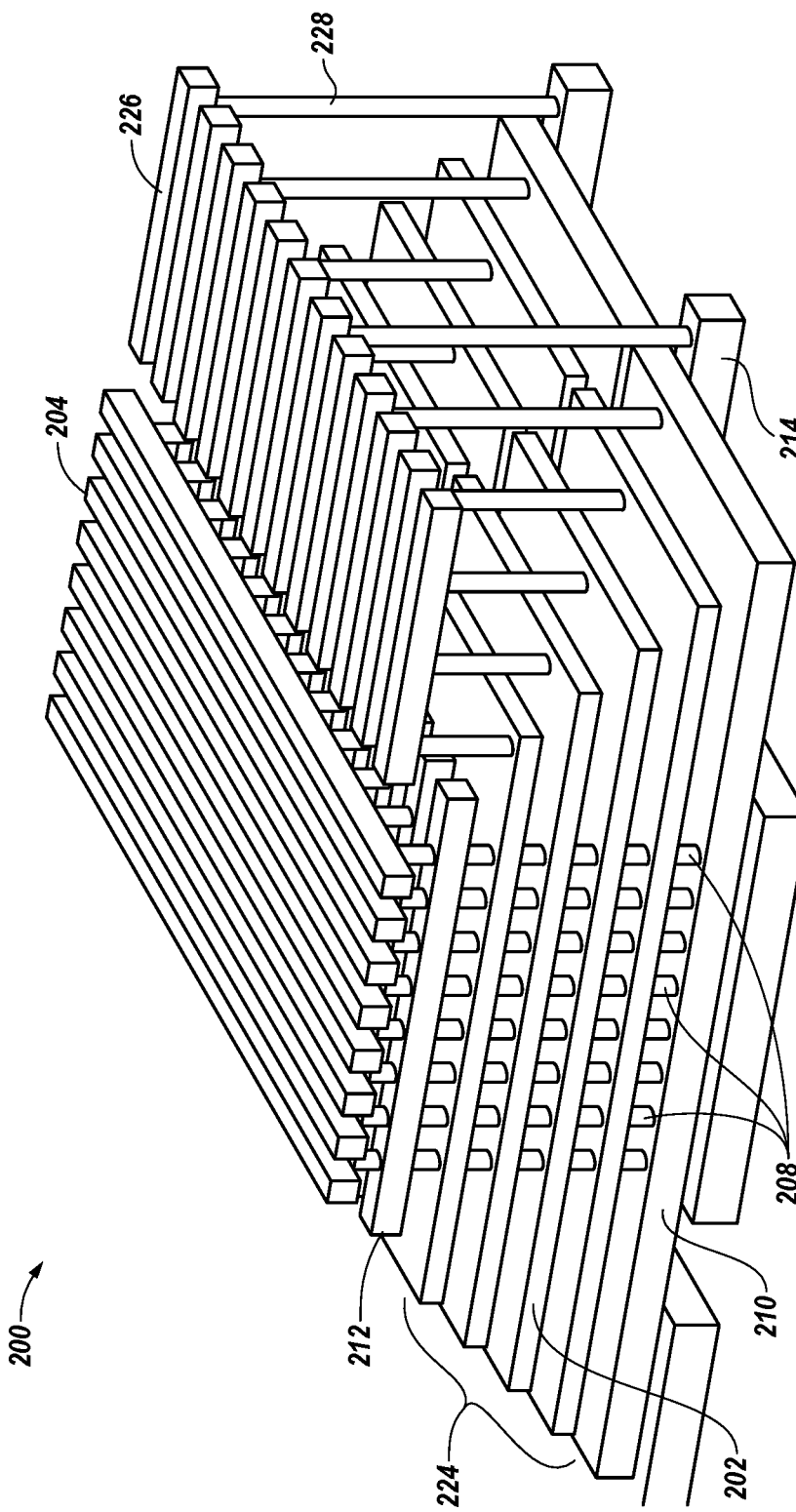
FIG. 2 is a perspective view of a portion of a three-dimensional memory array in accordance with a number of embodiments of the present disclosure.

FIG. 2 is a perspective view of a portion of a three-dimensional memory array 200 in accordance with a number of embodiments of the present disclosure. The 3D memory array 200 may comprise, for example, a NAND flash memory array, such as array 100 previously described in connection with FIG. 1. In some embodiments, memory array 200 may comprise a database. Memory array 200 may include a number of vertical strings of series-coupled memory cells 208 oriented orthogonal to a number of conductive lines, such as access lines 202 and/or sense lines 204.

A plurality of sense lines 204 may be oriented in a first plane, and further oriented in a first direction in the first plane, the vertical strings of series-coupled memory cells 208 being oriented orthogonal to the first plane. A plurality of access lines 202 may be oriented in a second plane, and further oriented in a second direction in the second plane. The access lines 202 may be formed in a planar configuration. The second plane may be substantially parallel to the first plane. The second direction may be perpendicular to the first direction, for example. The sense lines 204 may be shared by a number of vertical strings of series-coupled memory cells 208 in the first direction, and the access lines 202 may be shared by a number of vertical strings of series-coupled memory cells 208 in the second direction.

One or more source lines 214 may be oriented in a third plane, the third plane being substantially parallel to the first and second planes. The source lines 214 may be further oriented in the second direction, for instance, the same direction as the access lines 202 as shown in FIG. 2, or in a different direction. The select gates 212 and 210 may operate to select a particular vertical string of series-coupled memory cells 208 between a sense line 204 and a source line 214. As such, the vertical strings of series-coupled memory devices 208 may be located at the intersections of the sense lines 204 and source line 214.

The access lines 202 may be coupled to (and in some cases form) control gates of memory cells 208 at a particular level and may be used to select a particular one of the series-coupled memory cells 208 within a vertical string. In this manner, a particular memory cell 208 may be selected and electrically coupled to a sense line 204 via operation of the first select gate 212, second select gate 210, and an access line 202. The access lines 202 may be configured to select a memory cell 208 at a particular location within one or more of the vertical strings of series-coupled memory cells 208.

As illustrated in FIG. 2, the planar access lines 202 may be configured to have multiple three-dimensional stair step structures 224 to facilitate vertically-oriented coupling thereto, such as by vertical conductors 228. As such, respective planar access lines 202 may be formed as respective stair steps of the stair step structure 224. A stair step structure 224, as used herein, means a three-dimensional structure having a plurality of stair steps at different elevations extending to different distances in a lateral direction, such as is generally associated with a set of stair steps. According to one embodiment of the present disclosure, the steps of lower elevations may extend laterally beyond the lateral distance that the step at an immediately higher elevation extends, as shown in FIG. 2. For instance, lower steps may extend further in a lateral direction than step(s) above. A lower step may extend laterally a sufficient distance beyond a next higher step so that a vertical coupling may be made to the portion of the lower step extending laterally past the next higher step. In this manner, a vertical conductor 228 may be coupled to the lower step, such as to an access line 202, select gate 212 or 210, or source line 214, which each may correspond to a step in the stair step structure 224. In some embodiments, the vertical conductor 228 may extend down to additional circuitry, such as CMOS under array (e.g. CMOS under array 434 in FIG. 4B) circuitry.

The memory array 200 may be coupled to various circuitry associated with operating the memory array 200. Such circuitry may include string driver circuitry, for instance. As an example, horizontal conductive lines 226 may be routed from the memory array 200, for example, to a string driver. Steps of the stair step structure 224 may be coupled to the conductive lines 226, for instance, via the vertical conductors 228. In this manner, an electrical coupling may be made between the vertical stack of access lines 202, select gates 212 and 210, and/or source lines 214, and the string driver, via the planar horizontal conductive lines 226.

The strings of NAND memory cells (e.g. strings 106 of memory cells in FIG. 1) may be arranged with select gate transistors coupled at each end (e.g., source, drain). Each string may include a number of memory cells 208 coupled in series, drain-to-source. Vertical strings of NAND memory cells may be arranged such that the string of series-coupled memory cells are linearly arranged in a vertical orientation, or may be arranged in non-linear configuration such as in a "U" shape, with portions of the "U" shape being oriented vertically, for example. For instance, the string of series-coupled memory cells may be arranged in a dimension orthogonal to the planes encompassing the access lines (e.g., word lines) and sense lines (e.g., bit lines).

A memory device that includes array 200 may also include processing circuitry, such as CMOS under array circuitry (e.g. circuitry 434 later discussed in FIG. 4B). For instance, the processing circuitry can be formed on the same chip as array 200.

In some embodiments, the processing circuitry may be configured to receive a query, from a host (e.g., host 654 described in connection with FIG. 6), for data stored in the array 200 of memory cells, and search portions of the array 200 of memory cells for the data. In some embodiments, a controller (e.g., controller 664 described in connection with FIG. 6) of the memory device may be configured to receive the query from the host and search portions of the array 200 for the data. The memory device controller and/or processing circuitry may also be configured to determine data stored in the portions of the array 200 of memory cells that perfectly matches the query or more closely matches the query than other data stored in the portions of the array of memory cells. In some embodiments, the memory device in which the array 200 of memory cells is located may only transfer, to the host, the particular data that includes bits that match corresponding bits in the search key.

For example, the memory device controller and/or processing circuitry may be configured to receive a query from a host (e.g. host 654 discussed later in FIG. 6) for particular data stored in array 200 of memory cells. The particular data may correspond to a search key generated by the host. The memory device controller and/or processing circuitry may be further configured to search portions of the array 200 of memory cells, such as, for instance, different strings of the memory cells, for the particular data corresponding to the search key, and determine data stored in the portions of the array 200 of memory cells that perfectly matches or corresponds more closely to the search key than other data stored in the portions of the array 200 of memory cells. Further, the memory device controller and/or processing circuitry may be configured to transfer the data that perfectly matches and/or corresponds more closely to the search key than the other data to the host.

As used herein, the term "query" may refer to a request for data or information from a database or a combination of databases. The query for the particular data stored in array of memory cells 200 may include a query for data corresponding to a number of data fields. The data fields may include a logical block address (LBA) number, an LBA offset, and a count of bits that do not match corresponding bits in a search key. As used herein, the term "bit" may refer to a portion of data that can be stored in a memory cell. As used herein, the term "search key" may refer to an attribute or a set of attributes that are used to access a database record. The particular data may correspond to the search key if it more closely or perfectly matches the attributes. In some examples, the host may generate the search key. As used herein, the term "more closely" may refer to a threshold number of bits in the particular data being the same as the corresponding bits in the search key. For instance, a portion of data may correspond more closely to the search key than other data if the portion of data includes more bits that match corresponding bits in the search key than the other data, and/or if the number of bits in the portion of data that match the corresponding bits in the search key exceeds the threshold number of bits. As used herein, the terms "perfectly match" and "exactly match" may refer to every bit in the particular data matching a corresponding bit in the search key. For instance, a portion of data may perfectly or exactly match the search key if the bits of data stored in that portion of data perfectly and/or exactly match the corresponding bits in the search key.

In some embodiments, the memory device controller and/or processing circuitry may be configured to store the data that corresponds more closely to the search key in a separate memory device. The number of portions of the array 200 of memory cells whose data may be stored in the separate memory device may correspond to an amount of data included in each of the data fields. In some embodiments, the separate memory device may be a static random-access memory (SRAM) device. In some embodiments, a controller on the host may determine the amount of data included in each data field for the particular data. In some embodiments, the query includes the number of portions for the particular data.

The memory device controller and/or processing circuitry may be configured to determine the data that corresponds more closely to the search key based on an amount of current conducted by the portions of the array 200 of memory cells (e.g., by each different memory cell string) when current is applied to that portion. In some embodiments, the amount of current conducted by a portion of the array 200 of memory cells may increase (e.g., be greater) when more memory cells in that portion store data corresponding to the bits in the search key. Alternatively, the amount of current conducted by a portion of the array 200 of memory cells may decrease (e.g., be lower) when less memory cells in that portion store data corresponding to the bits in the search key. In some embodiments, the data stored in the portions of the array 200 of memory cells that conduct more current may be determined to correspond more closely to the search key than the other data stored in the portions of the array 200 of memory cells. Alternatively, the data stored in the portions of the array of memory cells that conduct less current may be determined to correspond less closely to the search key than the other data stored in the portions of the array 200 of memory cells. The data stored in the portions of the array 200 of memory cells that conducts the highest amount of current (e.g., a greater amount of current than all other portions of the array) may be determined to perfectly match the search key. This may occur because a memory cell in the portion of the array 200 of memory cells may conduct current if its data matches a corresponding bit in the search key, but may not conduct current if its data does not match any corresponding bits in the search key. Accordingly, memory cells that store data that does not match a corresponding bit in the search key may not conduct as much current as memory cells that store data that does match a corresponding bit in the search key.

FIG. 3 is an example representation of a communication protocol 364 for the acceleration of data queries in accordance with a number of embodiments of the present disclosure. For example, a host, such as host 654 described in connection with FIG. 6, may utilize the communication protocol 364 to send a query for particular data to a memory device. The host interface may also be configured to utilize the communication protocol 364 to receive the particular data from the memory device. In some embodiments, the particular data received by the host may be encrypted, and the host may be configured to decrypt the encrypted data.

As shown in FIG. 3, the protocol 364 may include a command 366, an address 368, data input 370, and data output 372. As used herein, the term "protocol" may be a system of rules that allow two or more entities in an electronic system to transmit information. The protocol may define the rules, syntax, semantics, and synchronization of communication and possible error recovery methods. The protocol may dictate how a host interface communicates with a memory device, for example.

The command 366 of the protocol 364 may be a search function 374, as shown in FIG. 3. For example, the command 366 may be a command to search an array of memory cells (e.g., array 100 of memory cells 108 described in connection with FIG. 1) for particular data stored in the array of memory cells. In some embodiments, the command 366 may be a query that is sent, by the host, to multiple portions of a memory device in parallel. In some embodiments, the command 366 to search for the particular data may comprise a command to search for the particular data stored in the memory device that perfectly matches corresponding bits in the search key. In some embodiments, the command 366 to search for the particular data comprises a command to search for the particular data stored in the memory device that more closely matches corresponding bits in the search key.

As shown in FIG. 3, the protocol 364 may also include an address 368. In some embodiments, the address 368 may be a part of the query. In some embodiments, the address may be an LBA for the particular data in the array of memory cells. The address 368 may also be an LBA range for the particular data (e.g., the query may include an LBA range for the particular data range of the LBA). As shown in FIG. 3, the address 368 may include a starting address 376 and an ending address 378 of the LBA range. The starting address 376 and the ending address 378 of the LBA range may denote the range of addresses searched during a query for the particular data.

As shown in FIG. 3, the protocol 364 may also include data input 370. The data input 370 may include data transferred from the host to the memory device. For example, as shown in FIG. 3, the data input may include a search key 380. The size of the search key can be set by the host, and can be, for instance, 1 to 16 kB.

The data input 370 may also include a query to search for particular data that perfectly matches and/or more closely matches the corresponding bits in the search key 380. For instance, the data input 370 may include parameters for (e.g., that control the functionality of) the search, such as a value (e.g., yes or no) indicating whether only a perfect or exact match is to be searched for, a value (e.g., from 1 to 100) indicating the quantity of closest matches to be searched for, and/or a value (e.g., from 1 to 1000) indicating the maximum quantity of bit errors for a match. Such parameters could be set by the host. The protocol may also include instructions dictating the rules under which the host and the memory device will communicate with each other.

As shown in FIG. 3, protocol 364 may also include data output 372. The data output 372 may include the data transferred from the memory device to the host. For example, as shown in FIG. 3, the data output may include a status 382 and data from a match result 384. The data output may also include the address in the memory device of the transferred data.

In some embodiments, the status 382 may be the status of the search. For example, the status 382 may be a signal that conveys to the host that the search of the memory array has been completed. In some embodiments, the status 382 may provide a pass/fail result of the query (e.g., an indication of whether the query was able to find the particular data).

In some embodiments, the data from match result 384 is transferred from the memory device to the host responsive to a host's request for the data from match result 384. The host may send the request responsive to the status 382 communicating to the host that the search is complete. In some embodiments, the data from match result 384 may be transferred to the host automatically. For example, the data from match result 384 may be transferred to the host without receiving a request from the host.

The data from match result 384 may include data that perfectly matches and/or more closely matches the corresponding bits in the search key 380. The protocol may include instructions to prioritize certain portions of data from match result 384 to be transferred from the memory device to the host before other portions of data from match result 384. For example, the protocol may include instructions to transfer data from match result 384 that more closely matches corresponding bits in the search key 380 than data from match result 384 that less closely matches corresponding bits in the search key 380.

In some embodiments, the memory device may be configured to store a particular quantity of the particular data that more closely matches the corresponding bits in the search key in a separate portion of the memory device. In some embodiments, the host may be configured to determine an amount of the particular data transferred to the host by determining the particular quantity of the particular data that is stored in the separate portion of the memory device. In some embodiments, the host may be configured to determine the order in which the particular quantity of the particular data is received by the host.

Figure 4A:
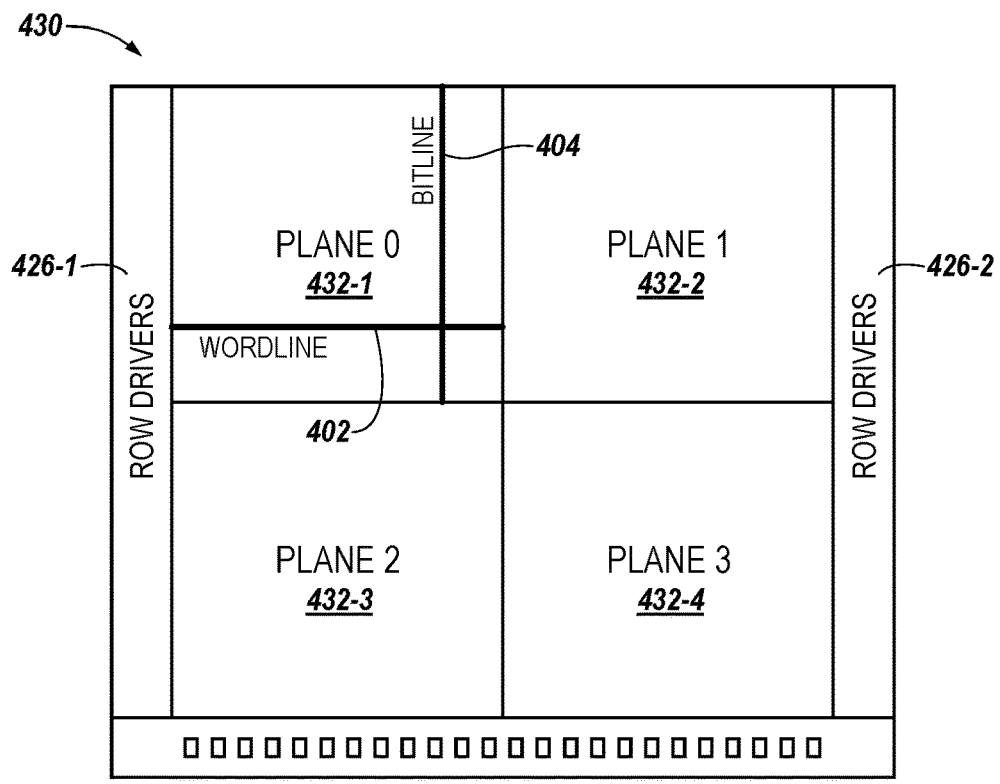
FIGS. 4A-4B are top-down views of different levels of a three-dimensional memory array in accordance with a number of embodiments of the present disclosure.
Figure 4B:
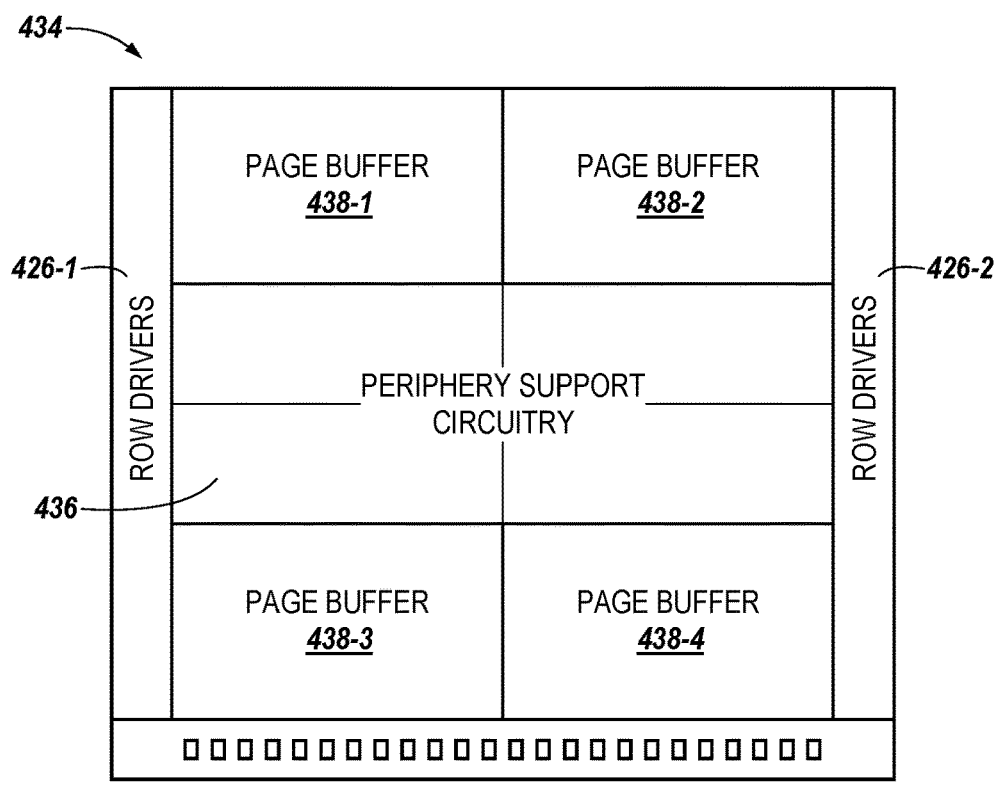

FIGS. 4A-4B are top-down views of different levels of a (e.g., within) 3D memory array such as, for instance, array 200 of FIG. 2, in accordance with a number of embodiments of the present disclosure. Other components included in a level of the 3D memory array may be omitted for ease of illustration.

FIG. 4A illustrates a level 430 of a 3D memory array. The level 430 of the 3D memory array may be one of the steps of the stair step structure of the array (e.g. stair step structure 224 of FIG. 2). The level 430 may be segmented into multiple planes of memory cells. For example, the level 430 may include a first plane (e.g. plane 0) 432-1, a second plane (e.g. plane 1) 432-2, a third plane (e.g. plane 2) 432-3, and a fourth plane (e.g. plane 3) 432-4 (individually or collectively referred to as planes 432). As illustrated, the first plane 432-1 may include a sense (e.g., bit) line 404 and an access (e.g., word) line 402. Although not shown in FIG. 4A, the second plane 432-2, the third plane 432-3, and the fourth plane 432-4 may also include access lines and sense lines. The level 430 may also include conductive lines (e.g. row drivers) 426-1 and 426-2 (individually or collectively referred to as conductive line 426). In some embodiments, the row drivers 426 may be contiguous to the planes 432.

FIG. 4B illustrates another level 434 of a 3D memory array in accordance with the present disclosure. In some embodiments, the level 434 may be under the stair step structure of the 3D memory array. For example, the level 434 may be a complementary metal oxide semiconductor (CMOS) under array structure. As used herein, the term "CMOS under array" may refer to logic circuitry for a memory array that is formed below the memory array. The level 434 (e.g., the circuitry of level 434) may be segmented into multiple page buffers that each correspond to a different one of the planes of memory cells. For example, the level 434 may include a first page buffer 438-1 that corresponds to plane 0, a second page buffer 438-2 that corresponds to plane 1, a third page buffer 438-3 that corresponds to plane 2, a fourth page buffer 438-4 that corresponds to plane 3. The level 434 may also include periphery support circuitry 436, and conductive lines (e.g. row drivers) 426-1 and 426-2 that are contiguous to the page buffers 438 and the periphery support 436.

Figure 5:
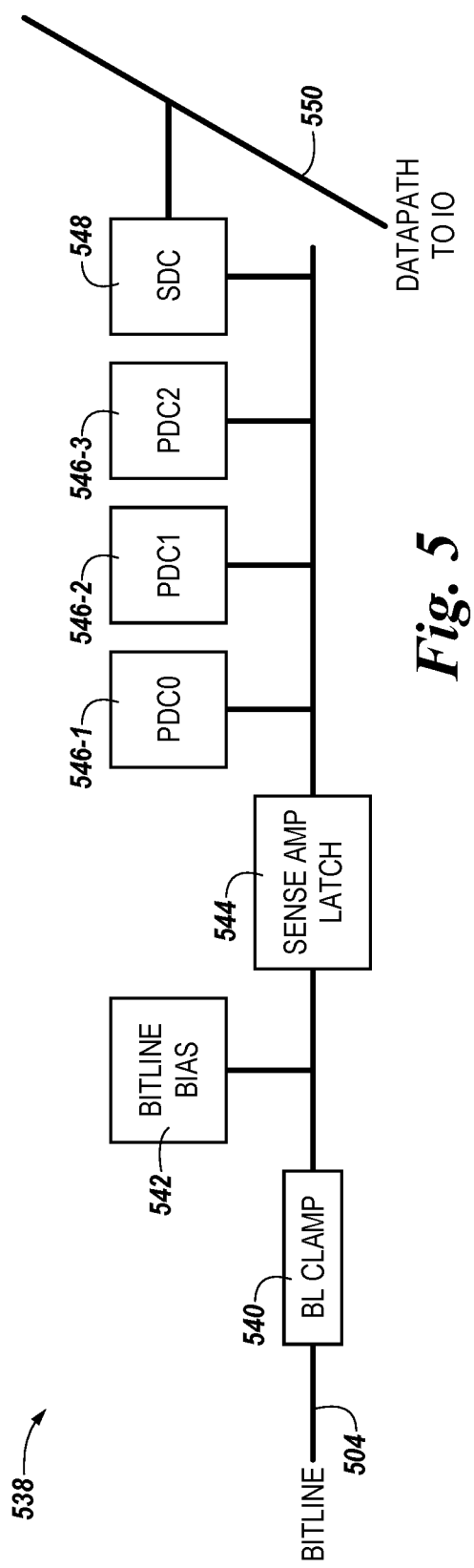
FIG. 5 is a block diagram of circuitry for the acceleration of data queries in memory in accordance with a number of embodiments of the present invention.

FIG. 5 is a block diagram of circuitry 538 for the acceleration of data queries in memory in accordance with a number of embodiments of the present disclosure. Circuitry 538 can be, for instance, a page buffer that is included in level 434 previously described in connection with FIG. 4B.

The circuitry 538 may include a sense (e.g., bit) line 504 that includes a sense line clamp 540, sense line bias circuitry 542, a sense amplifier (amp) latch 544, primary data caches 546-1, 546-2, and 546-3 (individually or collectively referred to as primary data caches 546), a secondary data cache 548, and an input/output (I/O) bus 550.

The sense line 504 may allow current to travel through the memory array. For instance, current can be provided to the string of memory cells coupled to sense line 504 by applying a current and/or voltage to sense line 504. The sense (e.g., bit) line clamp 540 may comprise a number of transistors that limit the amount of voltage that is applied across the sense line 504. By limiting the amount of voltage that is applied across the sense line 504, the sense line clamp 540 may protect the electrical components of the memory from receiving voltages that are larger than the intended voltages for the electrical components.

The sense line 504 may include (e.g., be coupled to) sense (e.g., bit) line bias circuitry 542. As used herein, the term "sense line bias circuitry" may refer to an electrical component that applies a current to the sense line 504 to keep a voltage across the sense line 504 in a certain range. The sense line bias circuitry 542 may work alongside the sense line clamp 540 to provide the intended level of voltage to the other electrical components on the sense line 504.

The sense line 504 may also include a sense amp latch 544. The sense amp latch 544 may be a part of read circuitry that is used to read data stored in a memory cell. By using circuitry including a sense amp latch 544 to read the data on a memory cell, the data on the memory cell may be compared to the search key to determine if the data on the memory cell is the same as a corresponding bit in the search key, as described herein.

The sense line 504 may include the primary data caches 546 and a secondary data cache 548. The primary data caches 546 may store frequently requested data and instructions so they are immediately available to the central processing unit (CPU). In some embodiments, the primary data caches 546 may be used as intermediate data storage for read operation algorithms and program algorithms. The secondary data cache 548 may be used for sending data to the I/O bus 560 and receiving data from the I/O bus. In some embodiments, the I/O bus 560 may couple to a host (e.g. host 654 in FIG. 6) and exchange data between the host and a memory device in accordance with rules established by the protocol.

The circuitry 538 may receive a request from a host 654 and the controller 664 may be configured to transfer, to the host 654, the particular data that perfectly matches and/or more closely matches corresponding bits in a search key as described in reference to FIGS. 1-4 and 6. The host may be configured to set criteria for which portions of the particular data stored in the memory device perfectly match or more closely match the corresponding bits in the search key. In some embodiments, the controller 664 is configured to automatically transfer, to the host 654, the particular data that more closely matches the corresponding bits in the search key. The controller 664, may also be configured to transfer, to the host, the particular data that matches each corresponding bit in the search key (e.g., perfectly matches the corresponding bits in the search key). In some embodiments, the controller 664 may be configured to automatically transfer, to the host 654, the particular data that matches each corresponding bit in the search key. By configuring the circuitry 538 to perform the functions as described herein, the circuitry may accelerate the speed of data queries in the 3D memory array. The circuitry 538 may be configured to perform functions, such as comparing portions of data to a search key and determining the data that perfectly matches or more closely matches the search key, that may have been performed by a host in previous approaches. This may allow the query to be performed faster than previous approaches by performing these functions in the memory device instead of transferring the data out of the memory device to perform the functions. This may increase the speed of the functions because it may reduce (e.g. eliminate) the time lag in performing the function caused by transferring the data out of the memory device before performing the functions.

Figure 6:
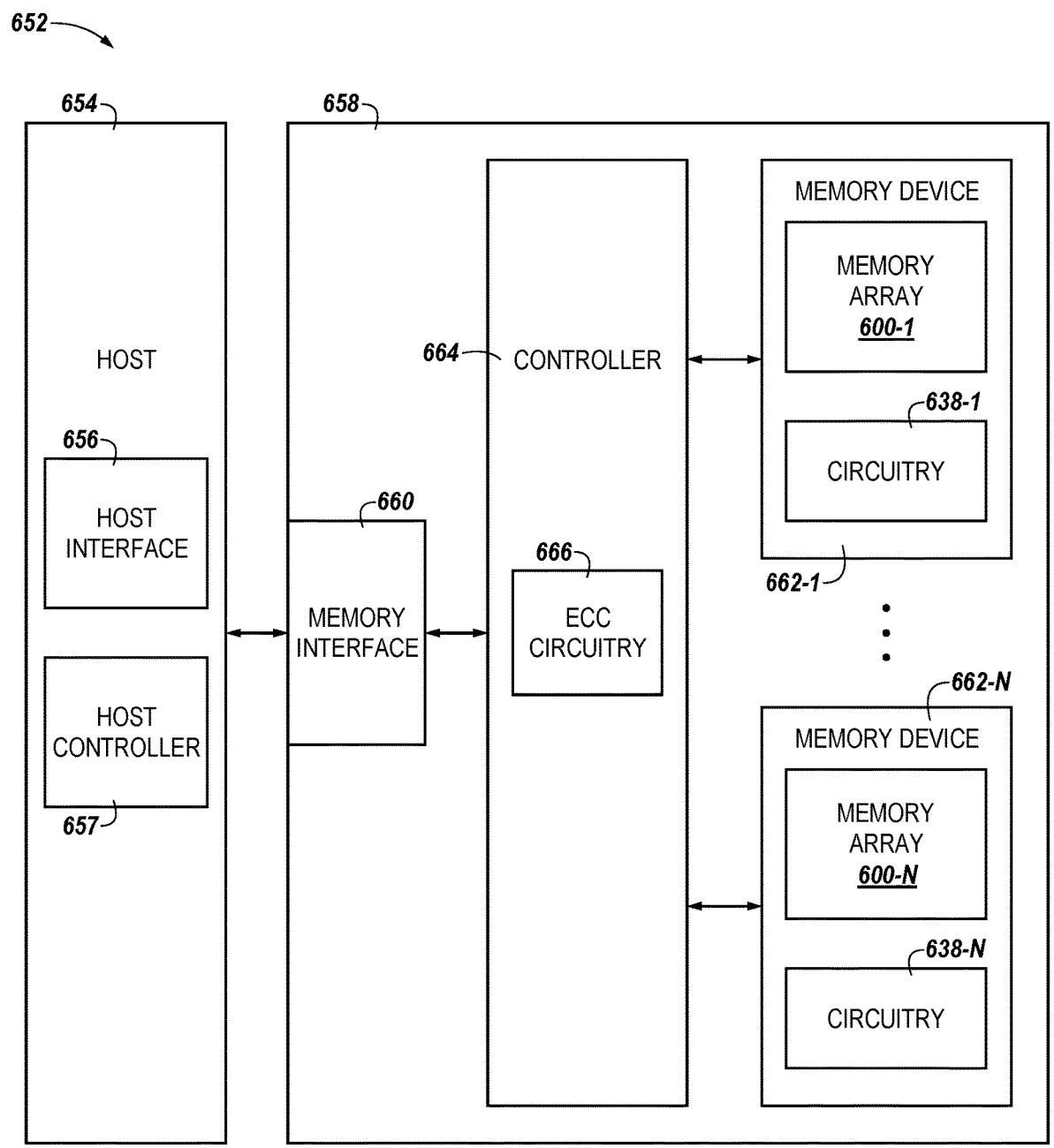
FIG. 6 is a functional block diagram of a computing system for acceleration of data queries in memory in accordance with a number of embodiments of the present disclosure.

FIG. 6 is a functional block diagram of a computing system 652 for the acceleration of data queries in memory in accordance with a number of embodiments of the present disclosure. In the embodiment illustrated in FIG. 6, computing system 652 includes a host 654 and a memory system 658. Memory system 658 may include a memory interface 660, a number of memory devices 662-1, . . . , 662-N (individually or collectively referred to as memory devices 662), and a controller 664 coupled to the memory interface 660 and memory devices 662. Memory interface 660 may be used to communicate information between memory system 668 and another device, such as a host 654.

Host 654 may include a processor (not shown). As used herein, "a processor" may be a number of processors, such as a parallel processing system, a number of coprocessors, etc. Example hosts may include, or be implemented in, laptop computers, personal computers, digital cameras, digital recording devices and playback devices, mobile telephones, PDAs, memory card readers, interface hubs, and the like.

In a number of embodiments, host 654 may be associated with (e.g., include or be coupled to) a host interface 656. The host interface may be used to communicate information between host 654 and memory system 658 using communication protocols (e.g., protocol 364 previously described in connection with FIG. 4) in accordance with the present disclosure.

Memory interface 660 may be in the form of a standardized physical interface. For example, when memory system 668 is used for information (e.g., data) storage in computing system 662, memory interface 660 may be a serial advanced technology attachment (SATA) interface, a peripheral component interconnect express (PCIe) interface, or a universal serial bus (USB) interface, among other physical connectors and/or interfaces. In general, however, memory interface 660 may provide an interface for passing control, address, information, scaled preferences, and/or other signals between the controller 664 of memory system 668 and a host 654 (e.g., via host interface 656).

Controller 664 may include, for example, firmware and/or control circuitry (e.g., hardware). Controller 664 may be operably coupled to and/or included on the same physical device (e.g., a die) as one or more of the memory devices 662-1, . . . , 662-N. For example, controller 664 may be, or may include, an ASIC as hardware operably coupled to circuitry (e.g., a printed circuit board) including memory interface 660 and memory devices 662. Alternatively, controller 664 may be included on a separate physical device that is communicatively coupled to the physical device (e.g., the die) that includes one or more of the memory devices 662.

Controller 664 may communicate with memory devices 662 to direct operations to sense (e.g., read), program (e.g., write), and/or erase information, among other functions and/or operations for management of memory cells. Controller 664 may have circuitry that may include a number of integrated circuits and/or discrete components. In a number of embodiments, the circuitry in controller 664 may include control circuitry for controlling access across memory devices 662 and/or circuitry for providing a translation level between host 654 and memory system 668.

Memory devices 662 may include, for example, a number of memory arrays 600-1, . . . , 600-N (individually or collectively referred to as memory arrays 600) (e.g., arrays of memory cells). Arrays 600 can be, for instance, 3D NAND arrays analogous to memory array 200 described in connection with FIG. 2.

Memory devices 662 may be formed on the same die. A memory device (e.g., memory device 662-1) may include one or more arrays of memory cells formed on the die. A memory device may include circuitry 638 associated with the one or more arrays formed on the die, or portions thereof. In some embodiments, the circuitry 638 may be utilized to determine (sense) a particular data value (e.g., 0 or 1) that is stored at a particular memory cell in a row of a memory array 622. In some embodiments, the circuitry 638 may be utilized to sense particular data values, in addition to directing storage, erasure, etc., of data values in response to a command from host 654 and/or host interface 656. The command may be sent directly to the circuitry 638 via the memory interface 660 or to the circuitry 638 via the controller 664.

The embodiment illustrated in FIG. 6 may include additional circuitry that is not illustrated so as not to obscure embodiments of the present disclosure. For example, memory devices 662 may include address circuitry to latch address signals provided over I/O connectors through I/O circuitry. Address signals may be received and decoded by a row decoder and a column decoder to access a memory array 600. It will be appreciated that the number of address input connectors may depend on the density and/or architecture of memory devices 662 and/or memory arrays 600.

The controller 664 and/or circuitry 638 may be configured to receive, from a host 654, a query for data stored in the array 600 of memory cells and search portions of the array 600 of memory cells for the data. The controller 664 and/or circuitry 638 may also be configured to determine the data stored in the portions of the array 600 of memory cells that perfectly match and/or more closely matches the query than other data stored in the portions of the array 600 of memory cells and transfer only the data that perfectly matches and/or more closely matches the query than the other data to the host 654.

The host 654 may include a host controller 657 configured to send a query to the memory device 662 for particular data stored in the memory device and generate a search key to denote the particular data. The query may include a command to search for the particular data in the memory device 662. In some embodiments, the query may include an indication for the particular data to be encrypted by the memory device 662. In some embodiments, the data may be encrypted by controller 664, and in some embodiments, the data may be encrypted by circuitry included on memory devices 662. The memory device 662 may only recognize the data in its encrypted form. In these embodiments, the query may request the data in its encrypted form. In other embodiments, the query may include an indication for the particular data to be unencrypted by the memory device 662. The host controller 657 may be configured to decrypt the encrypted data stored in the host 654 and the memory device 662.

In response to receiving the query from the host controller 657, memory device 662 may be configured to search portions of the memory device 662 for the particular data and count a number of bits in each portion of the memory device 662 that do not match the particular data denoted by the search key. This count may be performed to determine data stored in the portions of the memory device 662 that perfectly match and/or more closely match the query than other data stored in the portions of the memory devices 662. The memory device 662 may be further configured to transfer the data that perfectly matches and/or more closely matches the query than the other data to the host 654. The host controller 657 may be configured to determine which portions of the array of memory cells 600 perfectly match or more closely match the query by comparing the data sent to the host 654 to the search key.

In the example illustrated in FIG. 6, controller 664 may include error correction code (ECC) circuitry 666 configured to correct errors in the data that perfectly match and/or more closely matches the query. However, in some embodiments, ECC circuitry 666 may be included on each respective memory device 662. In some embodiments, the query may include a maximum error count for the query. In some embodiments, the particular data may not be sent to the host if the amount of errors in the particular data is greater than the maximum error count for the query. Memory devices 662 (e.g., NAND devices) may have errors randomly distributed amongst the data the NAND device 662 is storing. The errors in the data that perfectly matches and/or more closely matches the query may be corrected by the ECC circuitry 666 upon reading the data and before the data is sent to the host 654. In examples in which ECC circuitry is included on controller 664, the memory device 662 may not correct errors and, therefore, may need to communicate with the controller chip to correct the errors in the data. The memory system 668 may transfer the error correction code to the host 654 along with the particular data.

The host controller 657 may set parameters for the amount of bits in the particular data that do not match the corresponding bits in the search key that would result in the data not being sent to the host 654. In some embodiments, the host controller 657 may set a minimum mismatch bit count for the query. In some embodiments, the host controller 657, may also set a maximum mismatch bit count for the query. If the amount of bits in the particular data that do not match a corresponding bit in the search key is greater than the maximum mismatch bit count for the query or lower than the minimum mismatch bit count for the query, the particular data may not be sent to the host.

Groups of memory cells in the memory array 600 may be pages of memory cells. A typical page of a NAND device may be sixteen kilobytes (KB). The memory array 600 may search an entire page of memory cells in parallel.

Figure 7:
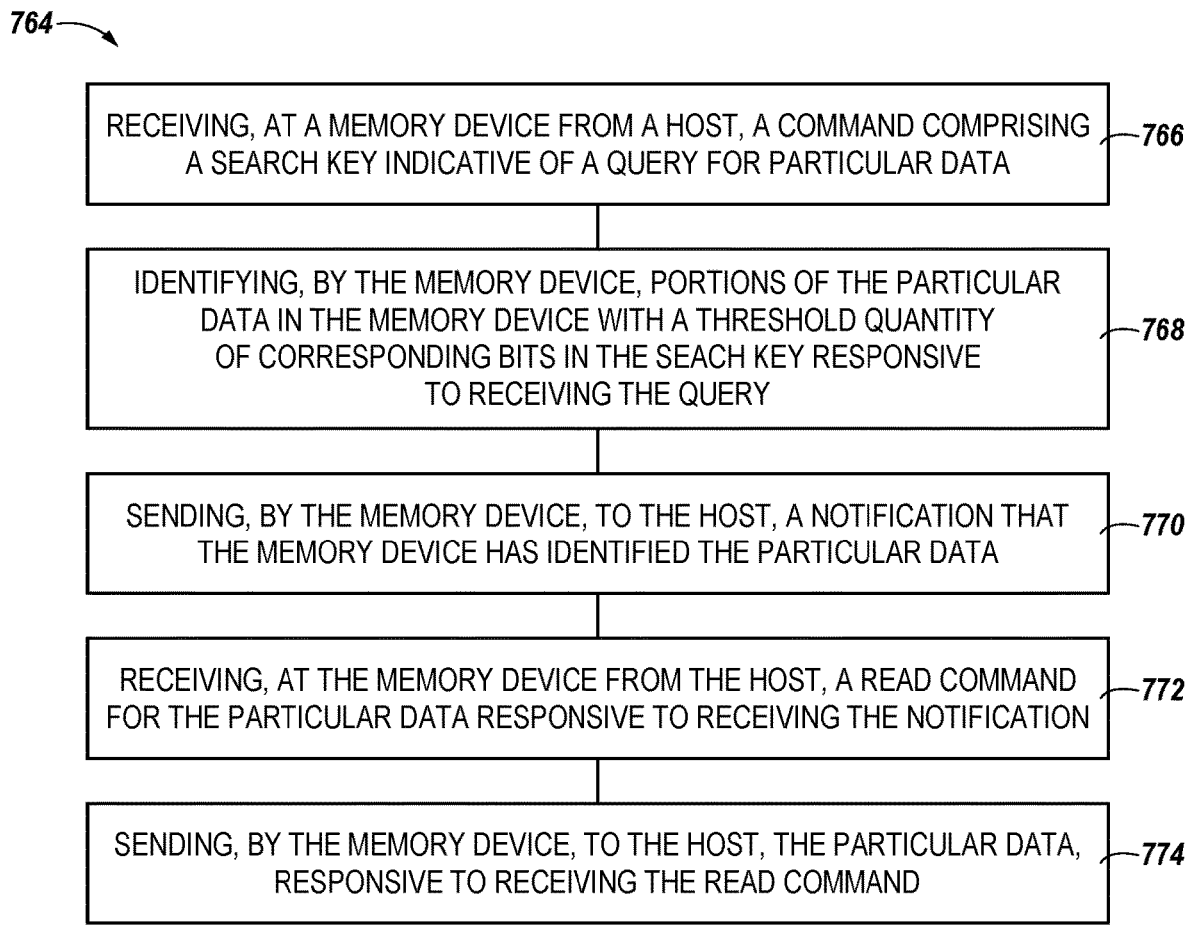
FIG. 7 is a flow diagram of an example method for acceleration of data queries in memory in accordance with a number of embodiments of the present disclosure.

FIG. 7 is a flow diagram of an example method 764 for acceleration of data queries in memory in accordance with a number of embodiments of the present disclosure. The method 764 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes may be modified. Thus, illustrated embodiments should be understood only as examples, and the illustrated processes may be performed in a different order, and some processes may be performed in parallel. Additionally, not all processes are required in every embodiment. Other process flows are possible.

At block 766, the method 764 includes receiving, at a memory device from a host, a command comprising a search key indicative of a query for particular data. In some embodiments, the query is configured to address multiple portions of the memory device in parallel. In some embodiments, addressing multiple portions of the memory device in parallel may accelerate the query because addressing multiple portions of the memory device (e.g., searching multiple portions of the memory device simultaneously or substantially simultaneously) may increase the speed of the search for particular data.

At block 768, the method 764 includes identifying, by the memory device, portions of the particular data in the memory device with a threshold quantity of corresponding bits in the search key responsive to receiving the query. In some embodiments, the threshold quantity of corresponding bits may be based, at least in part, on a configuration or mode set by the host. For example, the quantity of the threshold of corresponding bits may increase or decrease when the host changes the configuration or mode of the memory device.

At block 770, the method 764 includes sending, by the memory device, to the host, a notification that the memory device has identified the particular data. As stated above in connection with block 766, addressing multiple portions of the memory device in parallel may increase the speed of the search for the particular data. Therefore, addressing multiple portions of the memory device in parallel may result in identifying the particular data faster than a search that does not address multiple portions of the memory device in parallel.

At block 772, the method 764 includes receiving, at the memory device from the host, a read command for the particular data responsive to receiving the notification. At block 774, the method 764 includes sending, by the memory device, to the host, the particular data, responsive to receiving the read command. In some embodiments, the memory device may send the particular data to the host in a manner determined by the host. For example, the memory device may send the particular data to the host in an order specified by the host.

Figure 8:
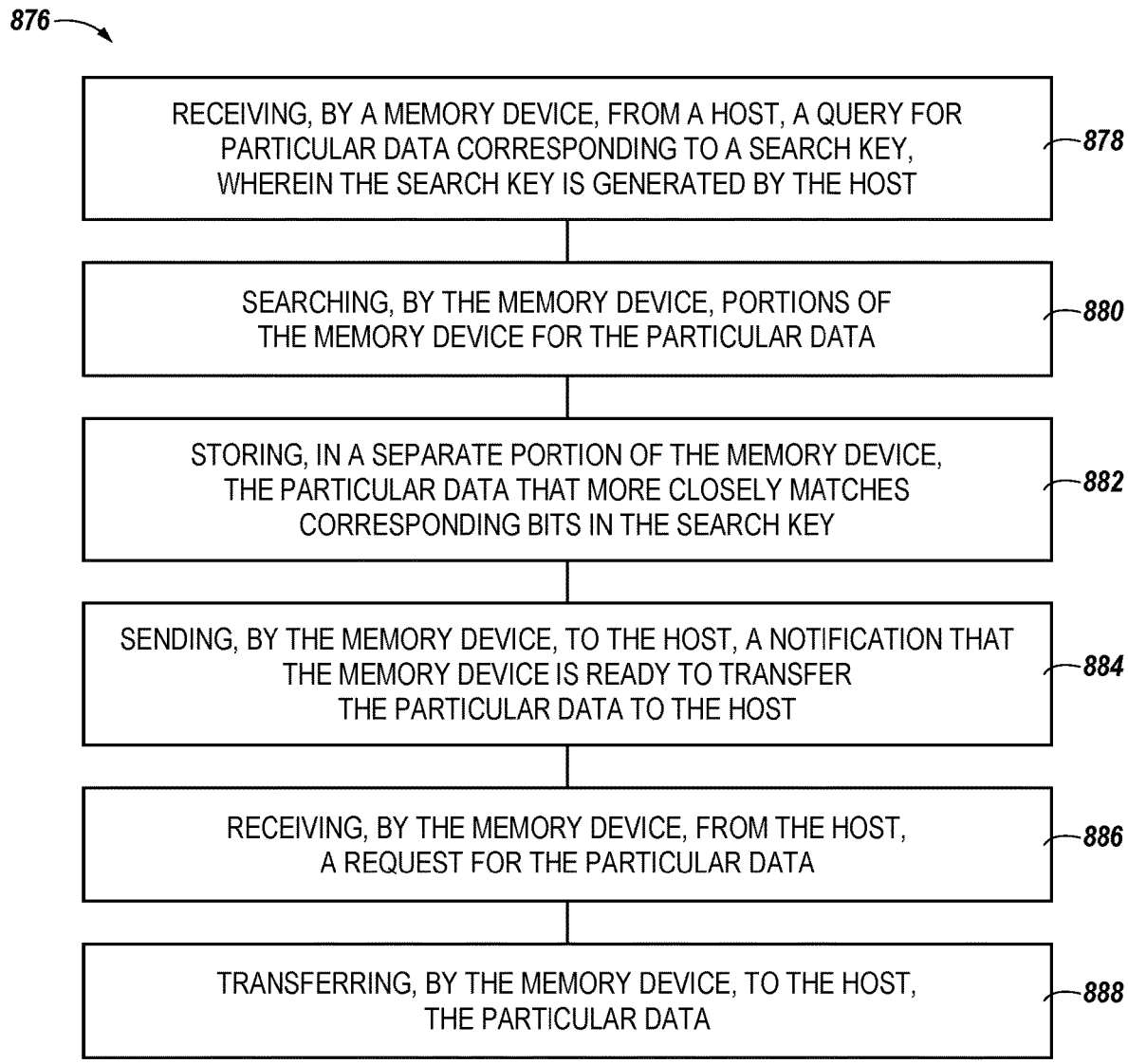
FIG. 8 is another flow diagram of an example method for acceleration of data queries in memory in accordance with a number of embodiments of the present disclosure.

FIG. 8 is another flow diagram of an example method 876 for acceleration of data queries in memory in accordance with a number of embodiments of the present disclosure. The method 876 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes may be modified. Thus, illustrated embodiments should be understood only as examples, and the illustrated processes may be performed in a different order, and some processes may be performed in parallel. Additionally, not all processes are required in every embodiment. Other process flows are possible.

At block 878, the method 876 includes receiving, by a memory device, from a host, a query for particular data corresponding to a search key, wherein the search key is generated by the host. At block 880, the method 876 includes searching, by the memory device, portions of the memory device for the particular data. In some embodiments, the memory device may search for particular data that more closely matches corresponding bits in the search key. In some embodiments, the memory device may search for particular data that perfectly matches corresponding bits in the search key.

At block 882, the method 876 includes storing, in a separate portion of the memory device, the particular data that more closely matches corresponding bits in the search key. The particular data that more closely matches corresponding bits in the search key may be determined by determining that the number of bits in the particular data that does not match corresponding bits in the search key is below a maximum mismatch bit threshold and above a minimum mismatch bit threshold. In some embodiments, data that perfectly matches corresponding bits in the search key may be stored in the separate portion of the memory device. The particular data that perfectly matches corresponding bits in the search key may be determined by determining that every bit in the particular data matches corresponding bits in the search key.

At block 884, the method 876 includes sending, by the memory device, to the host, a notification that the memory device is ready to transfer the particular data to the host. At block 886, the method 876 includes receiving, by the memory device, from the host, a request for the particular data. At block 888, the method 876 includes transferring, by the memory device, to the host, the particular data. In some embodiments, the particular data is transferred to the host after the memory device receives, from the host, a request for the particular data. In some embodiments, the memory device may automatically send the particular data to the host without receiving a request for the particular data from the host. In some embodiments, whether the memory device sends the particular data to the host in response to receiving a request from the host for the particular data or automatically sends the data to the host without receiving a request from the host may be determined by the particular data being sent to the host. For example, the particular data that more closely matches corresponding bits in the search key may be sent to the host in response to the host requesting the data from the memory device. However, the particular data that perfectly matches corresponding bits in the search key may be automatically transferred from the memory device to the host without receiving a request for the particular data from the host.

In the above detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

It is to be understood that the terminology used herein is for the purpose of describing particular embodiments only and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically and, unless stated otherwise, can include a wireless connection for access to and/or for movement (transmission) of instructions (e.g., control signals, address signals, etc.) and data, as appropriate to the context.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A host, comprising:
   a controller that:
   generates a search key;
   generates a query for particular data stored in an array of memory cells of a memory device, wherein the query includes:
   a command to search for the particular data; and
   a number of data fields for the particular data, including:
   a logical block address (LBA) for the particular data;
   an LBA offset for the particular data;
   a parameter indicating a maximum quantity of bit errors for the particular data; and
   a parameter for an amount of bits in data stored in the memory device that do not match corresponding bits in the search key that would result in the data not being sent to the host, wherein:
   the parameter for the amount of bits is based at least in part on a configuration of the memory device; and
   the configuration of the memory device is set by the host; and
   sends the query to the memory device, wherein:
   the controller stores a quantity of the particular data that more closely matches the corresponding bits in the search key in a separate memory device;
   the memory device searches portions of the array of memory cells for the particular data responsive to receiving the query from the host;
   the host determines an amount of the particular data to be transferred to the host by determining the quantity of the particular data that is stored in the separate memory device;
   the memory device transfers the particular data to the host based on:
   the maximum quantity of bit errors for the particular data; and
   the amount of bits in data stored in the memory device that do not match corresponding bits in the search key; and
   the particular data is not transferred to the host when a quantity of bit errors in the particular data is greater than the maximum quantity of bit errors for the particular data.

2. The host of claim 1, wherein the host includes a host interface that sends the query from the controller to the memory device.

3. The host of claim 1, wherein the query includes an indication for the particular data to be encrypted by the memory device.

4. The host of claim 1, wherein the query includes an indication for the particular data to be unencrypted by the memory device.

5. The host of claim 1, wherein the controller determines an amount of data included in each data field for the particular data.

6. The host of claim 1, wherein the query includes a number of data portions for the particular data.

7. The host of claim 1, wherein the command to search for the particular data comprises a command to search for the particular data stored in the memory device that matches each corresponding bit in the search key.

8. The host of claim 1, wherein the command to search for the particular data comprises a command to search for the particular data stored in the memory device that more closely matches corresponding bits in the search key.

9. The host of claim 1, wherein the query includes an LBA range for the particular data range of the LBA.

10. An apparatus, comprising:
    a memory device having an array of memory cells; and
    a controller that:
    receives, from a host, a query for particular data stored in the array of memory cells, wherein the particular data corresponds to a search key generated by the host, and the query includes:
    a logical block address (LBA) for the particular data;
    an LBA offset for the particular data,
    a parameter indicating a maximum quantity of bit errors for the particular data, and
    a parameter for an amount of bits in the particular data stored in the memory device that do not match corresponding bits in the search key that would result in the data not being sent to the host, wherein:
    the parameter for the amount of bits is based at least in part on a configuration of the memory device; and
    the configuration of the memory device is set by the host;
    searches portions of the array of memory cells for the particular data responsive to receiving the query from the host; and
    transfers, to the host, the particular data, wherein:
    the controller stores a quantity of the particular data that more closely matches the corresponding bits in the search key in a separate memory device; and
    the host determines an amount of the particular data transferred to the host by determining the quantity of the particular data that is stored in the separate memory device;
    the controller transfers the particular data to the host based on:
    the maximum quantity of bit errors for the particular data; and
    the amount of bits in the particular data stored in the memory device that do not match corresponding bits in the search key; and
    the particular data is not transferred to the host when a quantity of bit errors in the particular data is greater than the maximum quantity of bit errors for the particular data.

11. The apparatus of claim 10, wherein the apparatus includes an interface that transfers the particular data from the controller to the host.

12. The apparatus of claim 10, wherein the particular data transferred to the host is encrypted.

13. The apparatus of claim 10, wherein the controller transfers, to the host, the particular data that more closely matches corresponding bits in the search key.

14. The apparatus of claim 13, wherein the controller is configured to automatically transfers, to the host, the particular data that more closely matches the corresponding bits in the search key.

15. The apparatus of claim 10, wherein the controller transfers, to the host, the particular data that matches each corresponding bit in the search key.

16. The apparatus of claim 15, wherein the controller is configured to automatically transfers, to the host, the particular data that matches each corresponding bit in the search key.

17. A system, comprising:
a host; and
a memory device coupled to the host, wherein:
the host:
generates a search key;
sends, to the memory device, a query for particular data that more closely matches corresponding bits in the search key, wherein:
the query includes a parameter indicating a maximum quantity of bit errors for the particular data;
receives, from the memory device, a notification that the memory device is ready to transfer the particular data to the host; and
sends a request, to the memory device, for the particular data responsive to receiving the notification; and
the memory device:
searches portions of the memory device for the particular data responsive to receiving the query from the host;
identifies portions of the particular data with a threshold quantity of corresponding bits in the search key responsive to receiving the query from the host, wherein:
the threshold quantity of corresponding bits are based, at least in part, on a configuration of the memory device; and
the configuration of the memory is set by the host; and
transfers the particular data to the host responsive to receiving the request from the host, wherein:
the memory device stores a quantity of the particular data that more closely matches the corresponding bits in the search key in a separate memory device, and
the host determines an amount of the particular data transferred to the host by determining the quantity of the particular data that is stored in the separate memory device;
the memory device transfers the particular data to the host based on:
the maximum quantity of bit errors for the particular data; and
an amount of bits in the particular data stored in the memory device that do not match corresponding bits in the search key; and
the particular data is not transferred to the host when a quantity of bit errors in the particular data is greater than the maximum quantity of bit errors for the particular data.

18. The system of claim 17, wherein:
the particular data transferred to the host is encrypted; and
the host decrypts the encrypted data.

19. The system of claim 17, wherein a controller in the memory device corrects errors in the particular data that more closely matches the corresponding bits in the search key.

20. The system of claim 17, wherein the host determines the order in which the particular quantity of the particular data is received by the host.

21. A method, comprising:
receiving, at a memory device from a host, a command comprising a search key indicative of a query for particular data, wherein:
the query includes a parameter indicating a maximum quantity of bit errors for the particular data;
identifying, by the memory device, portions of the particular data in the memory device with a threshold quantity of corresponding bits in the search key responsive to receiving the query, wherein:
the threshold quantity of corresponding bits is based, at least in part, on a configuration of the memory device; and
the configuration of the memory device is set by the host;
sending, by the memory device, to the host, a notification that the memory device has identified the particular data;
receiving, at the memory device from the host, a read command for the particular data responsive to receiving the notification; and
sending, by the memory device, to the host, the particular data, responsive to receiving the read command, wherein:
the memory device stores a quantity of the particular data that more closely matches the corresponding bits in the search key in a separate memory device;
the host determines an amount of the particular data to be transferred sent to the host by determining the quantity of the particular data that is stored in the separate memory device;
the memory device sends the particular data to the host based on:
the maximum quantity of bit errors for the particular data; and
an amount of bits in the particular data stored in the memory device that do not match corresponding bits in the search key; and
the particular data is not sent to the host when a quantity of bit errors in the particular data is greater than the maximum quantity of bit errors for the particular data.

22. The method of claim 21, wherein the query addresses multiple portions of the memory device in parallel.

23. A method, comprising:
receiving, by a memory device, from a host, a query for particular data corresponding to a search key, wherein the search key is generated by the host, wherein:
the query includes a parameter indicating a maximum quantity of bit errors for the particular data;
searching, by the memory device, portions of the memory device for the particular data responsive to receiving the query from the host;
storing, in a separate portion of the memory device, the particular data that more closely matches corresponding bits in the search key, wherein:
the memory device identifies portions of the particular data in the memory device with a threshold quantity of corresponding bits in the search key responsive to receiving the query;
the threshold quantity of corresponding bits is based, at least in part, on a configuration of the memory device; and
the configuration of the memory device is set by the host;
sending, by the memory device, to the host, a notification that the memory device is ready to transfer the particular data to the host;
receiving, by the memory device, from the host, a request for the particular data; and
transferring, by the memory device, to the host, the particular data, wherein:

the memory device stores a quantity of the particular data that more closely matches the corresponding bits in the search key in a separate memory device;

the host determines an amount of the particular data transferred to the host by determining the quantity of the particular data that is stored in the separate memory device;

the memory device transfers the particular data to the host based on:
- the maximum quantity of bit errors for the particular data; and
- an amount of bits in the particular data stored in the memory device that do not match corresponding bits in the search key; and the particular data is not transferred to the host when a quantity of bit errors in the particular data is greater than the maximum quantity of bit errors for the particular data.

24. The method of claim 23, wherein the memory device only transfers, to the host, the particular data that includes bits that match corresponding bits in the search key.

25. The method of claim 23, further comprising transferring, by the memory device, error correction code to the host with the particular data.

26. The method of claim 23, further comprising determining the particular data that more closely matches the corresponding bits in the search key based on an amount of current conducted by a portion of the memory device.

* * * * *